(12) United States Patent
Kawabata

(10) Patent No.: US 11,494,884 B2
(45) Date of Patent: Nov. 8, 2022

(54) METHOD AND SYSTEM FOR EVALUATING IMAGE SHARPNESS

(71) Applicant: Canon U.S.A., Inc., Melville, NY (US)

(72) Inventor: Kazunari Kawabata, Tokyo (JP)

(73) Assignee: Canon U.S.A., Inc., Melville, NY (US)

( * ) Notice: Subject to any disclaimer, the term of this patent is extended or adjusted under 35 U.S.C. 154(b) by 235 days.

(21) Appl. No.: 16/795,949

(22) Filed: Feb. 20, 2020

(65) Prior Publication Data

US 2020/0273155 A1 Aug. 27, 2020

Related U.S. Application Data

(60) Provisional application No. 62/808,685, filed on Feb. 21, 2019.

(51) Int. Cl.
| | | |
|---|---|---|
| *G06T 5/20* | (2006.01) | |
| *G06T 7/00* | (2017.01) | |
| *H04N 1/62* | (2006.01) | |
| *H04N 1/40* | (2006.01) | |

(52) U.S. Cl.
CPC ............. *G06T 5/20* (2013.01); *G06T 7/0002* (2013.01); *H04N 1/40068* (2013.01); *H04N 1/62* (2013.01); *G06T 2207/30168* (2013.01)

(58) Field of Classification Search
CPC ..... G06T 5/20; G06T 7/0002; H04N 1/40068; H04N 1/62
USPC ........................................................ 382/260
See application file for complete search history.

(56) References Cited

U.S. PATENT DOCUMENTS

| | | |
|---|---|---|
| 8,611,673 B2 | 12/2013 | Aarabi et al. |
| 8,630,513 B2 | 1/2014 | Gokturk et al. |
| 8,655,028 B2 | 2/2014 | Hsi |
| 8,698,920 B2 | 4/2014 | Uemura et al. |
| 9,135,277 B2 | 9/2015 | Petrou |
| 9,275,269 B1 | 3/2016 | Li et al. |
| 9,405,771 B2 | 8/2016 | Balakrishnan et al. |
| 9,411,849 B2 | 8/2016 | Liu et al. |
| 9,798,960 B2 | 10/2017 | Santos et al. |
| 9,892,133 B1 | 2/2018 | Biessmann et al. |
| 9,928,407 B2 | 3/2018 | Ganong et al. |
| 10,157,190 B2 | 12/2018 | Shih et al. |
| 10,169,686 B2 | 1/2019 | Bourdev et al. |
| 2011/0019989 A1* | 1/2011 | Tanaka ................. H04N 13/139 396/104 |
| 2012/0308119 A1* | 12/2012 | Ogata ..................... G06T 7/593 382/154 |
| 2014/0055662 A1* | 2/2014 | Torabi .............. H04N 5/232123 348/345 |
| 2016/0007845 A1* | 1/2016 | Utagawa ............... A61B 3/1015 351/206 |

(Continued)

*Primary Examiner* — Ayodeji O Ayotunde
(74) *Attorney, Agent, or Firm* — Canon U.S.A., Inc., IP Division

(57) ABSTRACT

An image processing apparatus and method are provided which quantifies sharpness of one or more areas in an image. The sharpness processing includes acquiring an image from an image capturing apparatus, obtaining an object information characterizing a position of an object within the captured image, and controlling, based on a sharpness of each of a plurality of regions identified within the captured image according to the object information, an unit such that a sharpness information representing a numeric value regarding a sharpness of the captured image is displayed with the captured image.

15 Claims, 11 Drawing Sheets

(56) References Cited

U.S. PATENT DOCUMENTS

| | | |
|---|---|---|
| 2017/0318235 A1* | 11/2017 | Schneider .......... G06K 9/00664 |
| 2018/0173996 A1 | 6/2018 | Lim |
| 2018/0181827 A1 | 6/2018 | Kim et al. |
| 2018/0189615 A1 | 7/2018 | Kang et al. |
| 2019/0042574 A1 | 2/2019 | Kim et al. |
| 2019/0180446 A1 | 6/2019 | Medoff et al. |
| 2019/0188539 A1 | 6/2019 | Lee et al. |

* cited by examiner

Focus frame type 1

Focus frame type2

Image 1
Object = eye

Evaluation area: Iris ratio >50%, average

Image 2
Object = squirrel

Evaluation area: 3x3 from the center, average

METHOD AND SYSTEM FOR EVALUATING IMAGE SHARPNESS

CROSS-REFERENCE TO RELATED APPLICATIONS

This is a nonprovisional patent application that claims the benefit of U.S. Provisional Patent Application Ser. No. 62/808,685 filed on Feb. 21, 2019, the entirety of which is incorporated herein by reference.

BACKGROUND

Field

The present invention relates generally to image processing.

Description of Related Art

The amount and degree of sharpness of an image is important to how the user feels about that image. For example, in a situation where there are many images, and a user wants to find an image which shows an eye of the object most sharply and clearly and which has a focus point at the eye, the user needs to look at all the images and compare them. On the other hand, although some data related to image focus such as autofocus (AF) area position and AF area in focus are saved with an image data, it is not easy for the user to know that which objects of images is most sharply and clearly.

SUMMARY

According to aspects of the disclosure, the above drawbacks are remedied by a system and method that performs image evaluation by receiving image data, obtaining sharpness information from the received image data, and evaluating sharpness data based one or more elements of sharpness information associated with the received image data.

In one embodiment, an image processing method is provided. The image processing method includes acquiring an image from an image capturing apparatus, obtaining an object information characterizing a position of an object within the captured image, and controlling, based on a sharpness of each of a plurality of regions identified within the captured image according to the object information, an unit such that a sharpness information representing a numeric value regarding a sharpness of the captured image is displayed with the captured image.

In another embodiment, an image processing apparatus is provided. The image processing apparatus includes at least one memory storing instructions and at least one processor that, upon execution of the instructions, is configured to acquire an image from an image capturing apparatus, obtain an object information characterizing a position of an object within the captured image, and control, based on a sharpness of each of a plurality of regions identified within the captured image according to the object information, an unit such that a sharpness information representing a numeric value regarding a sharpness of the captured image is displayed with the captured image.

These and other objects, features, and advantages of the present disclosure will become apparent upon reading the following detailed description of exemplary embodiments of the present disclosure, when taken in conjunction with the appended drawings, and provided claims.

Figure 1A:
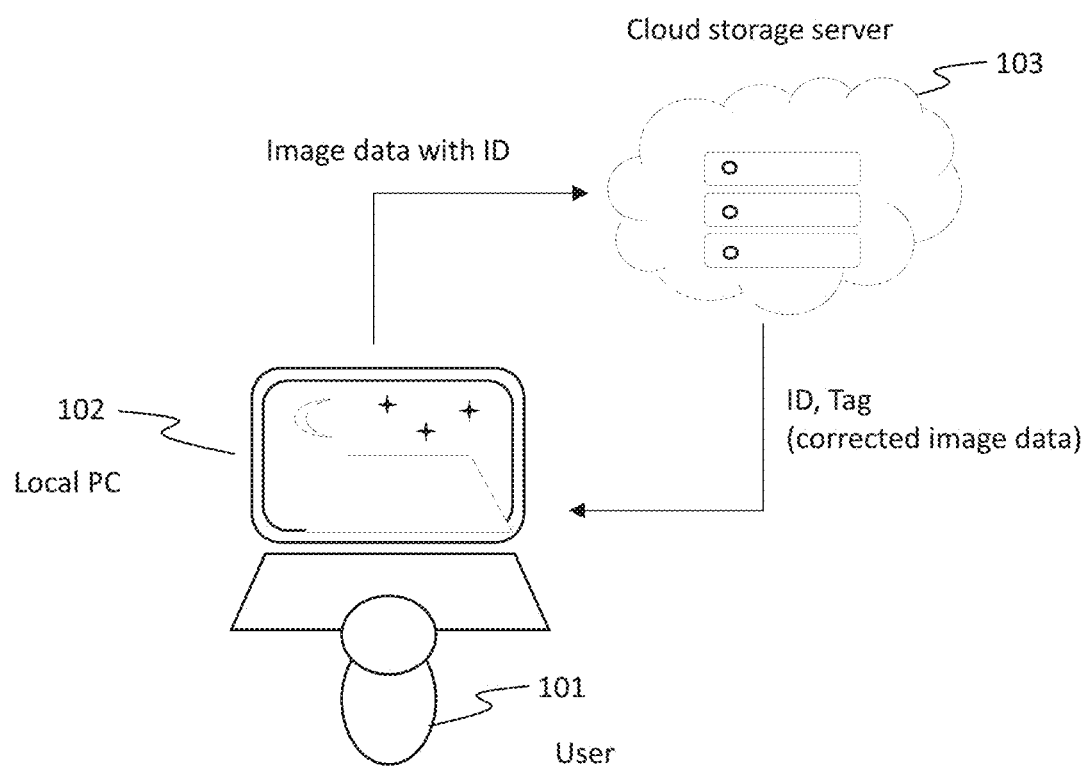
FIG. 1A is a system diagram.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DESCRIPTION OF THE EMBODIMENTS

Exemplary embodiments of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment and, according to the Figures and embodiments described below, embodiments described can be applied/performed in situations other than the situations described below as examples.

Figure 1B:
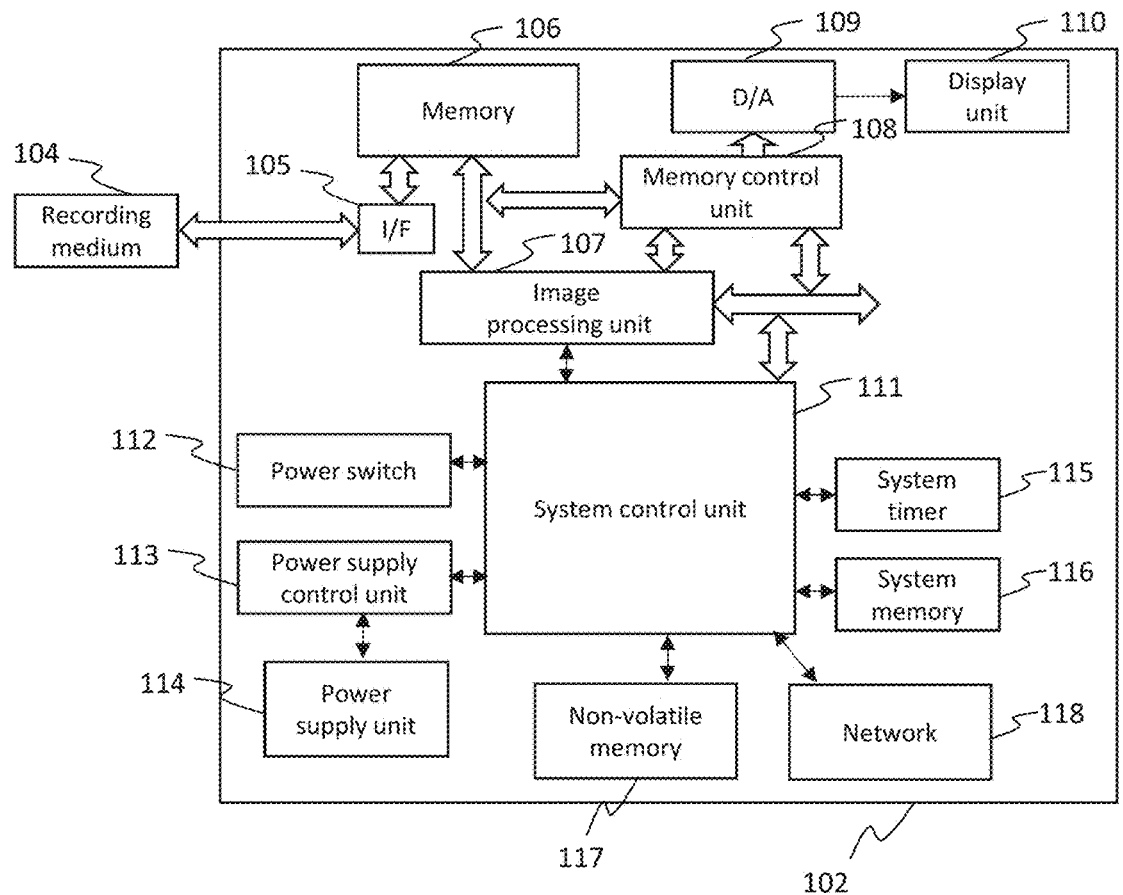
FIG. 1B is a block diagram of the local side operations of the system.
Figure 1C:
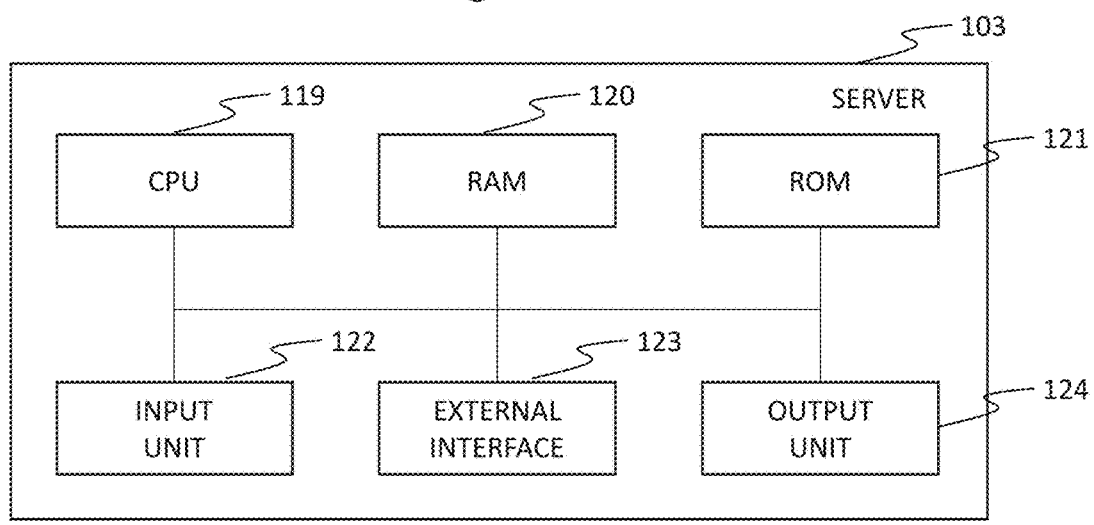
FIG. 1C is a block diagram, of the server side operations of the system.

FIG. 1-A shows a schematic diagram of a system where a user 101 edits, stores and/or organizes image data through an application executing on a local PC 102. The application is communicatively connected to a cloud storage server 103. User 101 can search and/or edit image data displayed on a display associated with the local PC 102 and also can upload new image data through the local PC 102 to the cloud storage server 103. Image data uploaded to the cloud storage server 103 is stored and/or organized by a CPU 119 (see FIG. 1C) in the cloud storage server 103. The CPU 119 is configured to not only to identify objects on the image data, but also evaluate quantitative features related to image quality such as sharpness, focus, tilt, noise, exposure, dynamic range, aberration, diffraction distortion and vignetting.

FIG. 1B shows an exemplary configuration the local PC 102 according to the present exemplary embodiment. In FIG. 1B, a recording medium 104 is illustrated. The recording medium 104 may be a memory card for storing captured image data and may be considered storage device. The recording medium 104 may be configured from a semiconductor memory or a magnetic disk, for example. Through the interface 105 and a memory 106, an image processing unit 107 in the local PC 102 can access image data transferred from the recoding medium 104 to process data. The memory 106 operates as a buffer for a data set. In one embodiment, the recording medium is non-transitory. Throughout this disclosure the recording medium 106 may be described as a memory or storage as well.

An image processing unit 107 can perform image searching, resizing processing such as reduction or enlargement, and color conversion processing on data or data supplied from a memory control unit 108. An image processing unit may be a central processing unit or graphical processing unit. In one embodiment, the image processing unit may execute instructions stored in a dedicated memory which specifically configures the image processing unit to perform the described functions and/or operations. In another embodiment, the image processing unit 107 may be embodied as an ASIC.

The image data stored in the memory 106 is converted into digital data by the A/D converter 109, and is displayed on the display unit 110. The memory 106 includes a sufficient storage capacity to store a predetermined number of still images. In another embodiment, the memory 106 may include sufficient storage capacity to store moving images that may or may not include audio for a predetermined time length. The memory 106 also has a function as a source of video memory for image display on the display unit 110.

A non-volatile memory 117 is an electronically erasable/recordable memory. The non-volatile memory 117 may be, for example, an electrically erasable programmable read-only memory (EEPROM). In the nonvolatile memory 117, control programs and instructions that are executed by the system control unit 111 are stored. Such programs are programs, when executed by one or more of the processing units described herein, cause the one or more processing units to perform the operations and/or functions in the various flowcharts described below according to the present exemplary embodiment.

The system control unit 111 executes operations which control the local PC 102. The system control unit 111 realizes some of the below-described processes of the present exemplary embodiment by executing the programs recorded in the non-volatile memory 117. A random-access memory (RAM) is used as a system memory 116 which operate as a work area for the data associated with execution of the control programs by the system control unit 110 during various operations. The system control unit 111 also performs display control by controlling the memory 106, the D/A converter 109, and the display unit 110. The system control unit 111 may include one or more central processing units to perform the described functions.

A system timer 115 is a time measurement unit that measures the time for various controls and the time of a built-in clock.

A power supply control unit 113 is configured from a battery detection circuit, a direct current-direct current (DC-DC) converter, a switching circuit for switching blocks to which power is supplied and the like. The power supply control unit 113 detects whether a battery is mounted or not, a type of the battery, and a remaining battery level. Based on the detection results and an instruction from the system control unit 111, the power supply control unit 113 controls the DC-DC converter and supplies a required voltage to the various parts, including the recording medium 104, for a required period of time.

A power supply unit 114 is configured from, for example, a primary battery, such as an alkali or a lithium battery, a secondary battery, such as a NiCd battery, a NiMH battery, and a Li battery, and an alternating current (AC) adapter. A recording medium interface (I/F) is an interface with the recording medium 104, which is a memory card, a hard disk and the like. The recording medium 104 may be a memory card for recording captured image data. The recording medium 104 is configured from a semiconductor memory or a magnetic disk, for example.

The local PC 102 has a network connection interface 118 and can communicate with other devices such as cloud storage server 103. Communication can occur via local area network and/or wide area network. The communication facilitated by the network connection interface 118 may include wired communication such as by Ethernet cable connection and/or wireless communication including short and long distance wireless communication such as WiFi, Bluetooth, NFC and the like.

Image data uploaded to the cloud storage server 103 is stored and/or organized by a CPU 119 in the cloud storage server 103 in FIG. 1-C. FIG. 1-C shows a configuration example of the local PC 102 according to the present exemplary embodiment. The reference to Local PC 102 should not be construed as limiting and any computing device, including but not limited to a personal computer, laptop computer, smartphone, tablet computer and the like.

The cloud storage server 103 includes a CPU 119, a RAM 120, a ROM 121, an input unit 122, an external interface 123, and an output unit 124.

The CPU 119 of the cloud storage server 103 is configured to not only to identify objects in the image data, but also evaluate quantitative features related to image quality such as sharpness, focus, tilt, noise, exposure, dynamic range, aberration, diffraction distortion and vignetting which will be described later. In addition, the CPU 119 is configured to generate numerical values related to image quality tag items based on the image quality evaluation which may be performed by a trained image recognition engine that was trained beforehand using a plurality of training images.

The CPU 119 is configured to control the entire of the cloud storage server 103 by using a set of stored instructions and/or one or more computer programs in conjunction with data stored in the RAM 120 or ROM 121. Here, the cloud storage server 103 may include one or more dedicated hardware or a graphics processing unit (GPU), which is different from the CPU 119, and the GPU or the dedicated hardware may perform a part of the processes by the CPU 119. As an example of the dedicated hardware, there are an application specific integrated circuit (ASIC), a field-programmable gate array (FPGA), and a digital signal processor (DSP), and the like. The RAM 120 temporarily stores the computer program or data read from the ROM 121, data supplied from outside via the external interface 123, and the like. The ROM 121 stores the computer program and data which do not need to be modified.

The input unit 122 is composed of, for example, a joystick, a jog dial, a touch panel, a keyboard, a mouse, or the like, and receives user's operation, and inputs various instructions to the CPU 119. The external interface 123 communicates with external device such as PC, smartphone, camera and the like. The communication with the external devices may be performed by wire using a local area network (LAN) cable, a serial digital interface (SDI) cable, WIFI connection or the like, or may be performed wirelessly via an antenna. The output unit 124 is composed of, for example, a display unit such as a display and a sound output unit such as a speaker, and displays a graphical user interface (GUI) and outputs a guiding sound so that the user can operate the cloud storage server 103.

Figure 2:
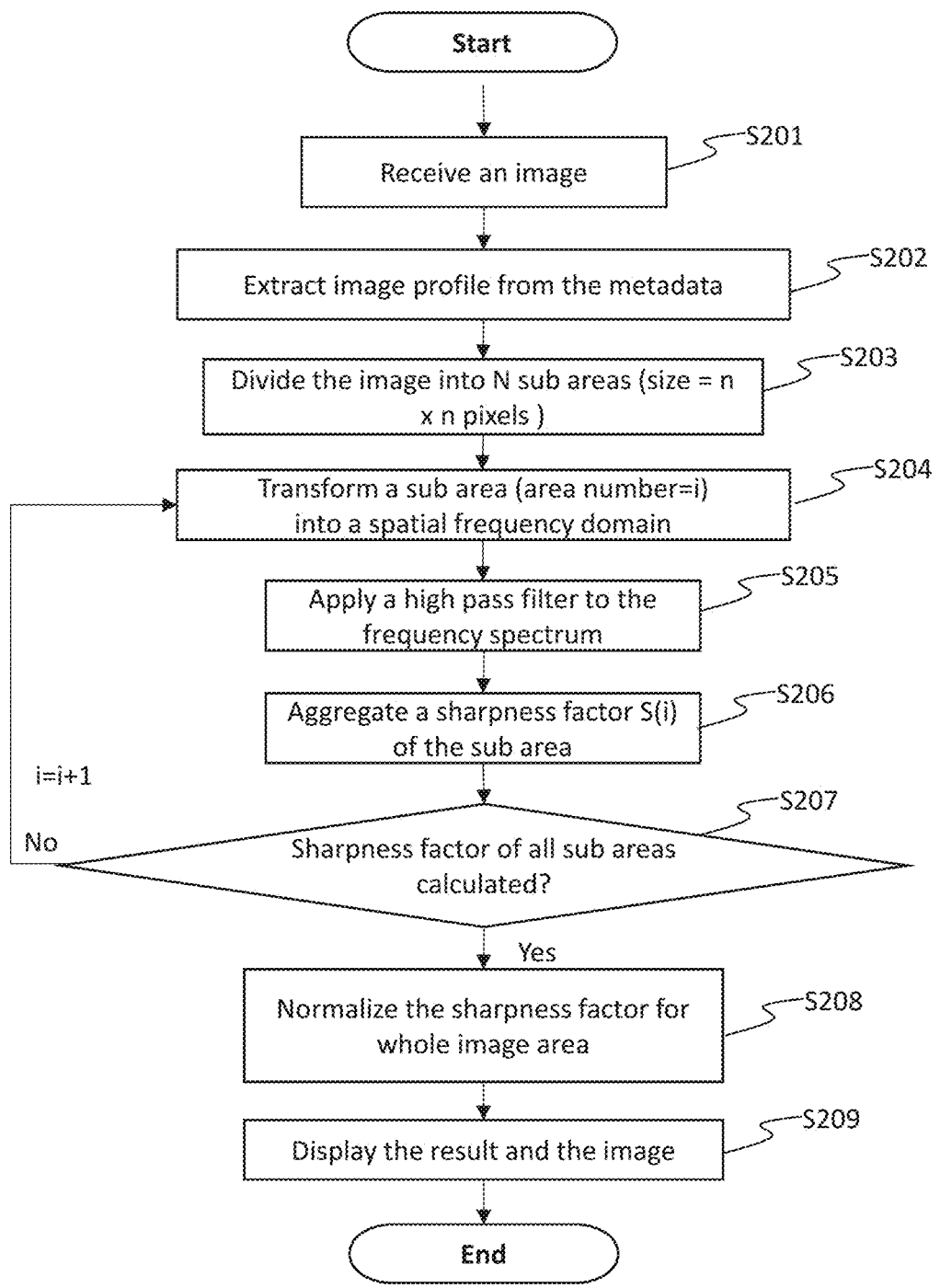
FIG. 2 is a flow diagram for sharpness evaluation based on image profile.

FIG. 2 illustrates a flow chart of the processing associated with a sharpness quantifying application according to the present exemplary embodiment. The processing is performed by the CPU 119 that executes instructions in the RAM 120 and/or in the ROM 121. The processing in FIG. 2 starts when the cloud storage server 103 is started up and an application for the sharpness quantifying processing becomes operable, for example, in response to user selection thereof.

In S201, the CPU 119 receives at least one image from the local PC 102. In S201, the at least one image may be selected from images that the user 101 imports to the PC 102 from the recording medium 104 (or other external image data source), and the user 101 controls the application to show a sharpness value associated with the image. In another embodiment, the image may be all images that the user 101 imports to the PC 102. In other embodiments, it can be all images which are imported into an application in the PC 102 or all images stored in a cloud storage server 103.

In S202, the CPU 119 extracts/reads an image profile from the metadata attached to or associated with the image. The metadata includes a plurality of different types of image information. Examples of the different types of image information contained in the metadata include any one or more of image format, date and time when the image was taken, number of pixels (image height and image width), number of auto focus(AF) area, AF area position, selected AF point, a model name of an imaging device used to take the image, etc. These are merely exemplary and any type of image information that can be associated with a captured image, either generated by the imaging device at or around the time of image capture or added by a user after the image has been captured may be included in the image information in the metadata.

In S203, the CPU 119 divides the image into N sub areas. The number of pixels of one sub area is determined beforehand and it has n pixel in X direction and n pixels in Y direction. Therefore, in a case that the number of pixels of the image in each X and Y direction are Nx and Ny, the number of sub areas in X direction becomes Nx/n, and the number of sub areas in Y direction becomes Ny/n. In the case that Nx and/or Ny are indivisible by n, the remaining pixels will not be considered. For example, in the case that Nx=6720 and Ny=4480, and n=100, number of sub areas in each direction becomes 67 and 44. And, the remaining pixels 6720−67*100=20 and 4480−44*100=80 will not be considered. Those pixels which will not be considered can be at the edge of the image or middle of the image. In one embodiment, the number of pixel n equals to 100. However, this is merely exemplary and can be any positive integer.

Moreover, if the size of the sub area is the size such as n=1000*1000, each sub area may not be able to reflect slight changes in frequency and sharpness of the image. On the other hand, if the size of the sub area is the size such as n=5*5, the result may show more spots which has high sharpness value. This is called noise and the noise occurred, for example, in pixels such as white dead pixel from real high frequency signals on the object. In this case, it is very difficult to discern noise from the point which the user might think that it is not a noise.

In addition, in the case that the image size is, for example, 100*100, the user 101 usually may not need to know sharpness, because the images is originally taken under low resolution setting and the result of the sharpness might not be important for the user when the user takes the image with that size. On the other hand, in the case that the image size is the size such as 2000*1000 which is larger than 100*100, the user may need to know sharpness values of the image because the quality of the image can be different and might correspond to the result of the sharpness. In other words, there may exist a predetermined image size threshold that governs when sharpness evaluation is desirable to perform.

In S204, the CPU 119 transforms a sub area of the plurality of sub areas whose area number is =i from spatial domain into a spatial frequency domain by a method based on Fourier transform. In this case, other transformation method such as discrete Fourier transform and discrete cosine transform are also good for calculating the spatial frequency. Based on the method used to the transform the sub area from real domain into spatial frequency domain, the spectrum in spatial transform domain is to be normalized for power spectrum analysis. Operation of S204 is performed on the area number=i and when the processing proceeds to S207 and the determination of S207 is No, the next S204 is performed for the area number=i+1.

In S205, the CPU 119 applies a high pass filter to the spectrum generated in S204 which is just before the present S205. In this case, the cut off frequency of the high pass filter can be set at Cx and Cy for x direction and y direction, respectively.

For example, Cx and Cy can be 20 which mean that the cutoff frequency threshold indicates that the high pass filter only passes spectrum which has higher frequency than the 20th basis from the origin corresponding to direct current (DC, spatial frequency=0) in the spatial frequency domain out of all 100*100 basis. In this case, the basis of the DC corresponds to (Cx, Cy)=(1st, 1st). For a diagonal direction, a cut off frequency can be set by based on the coordinate (Cx in X axis, 0 in Y axis) and (0 in X axis, Cy in Y axis) in the spatial frequency domain. In this case, the cut off area is set as square (0,0), (Cx,0), (0,Cy), (Cx,Cy) in the spatial frequency domain.

Therefore, frequency components which have not been cut off in S205 will be aggregated. This cut off operation makes the evaluation more useful and results in an improved way to evaluate sharpness precisely for objects which have high frequency patterns associated therewith. The detail of this procedure will be described later in FIG. 3.

In S207, the CPU 119 determines if operation of S206 for all sharpness factor S(i)s are performed. If the CPU 119 determines that operation of S206 for all sharpness factor S(i)s are performed, the processing proceeds to S208. If the determination in S207 indicates S206 has not been performed for all factors S(i)s, the processing proceeds to S204, and the subarea number is increased from i to i+1 and the processing continues until the determination in S207 results in the sub area number i reaching the total number of all sub areas generated by the image division in S203.

In S208, the CPU 119 normalizes the sharpness factor S(i)s which were outputs in S206 for all the sub areas. Concretely, all sharpness factor S(i)s are divided by the maximum value of all S(i)s. For example, if the maximum value of the all S(i)s is 5046 and the S(1)=1014, normalized S(1) would be 0.201 (=1014/5046). This is merely one manner of normalization but S208 is not limited to the above method and the other examples are described below.

In S208, the normalization of S(i) can be performed by using a predetermined specific value of images for any images. For example, it is more convenient for comparing images when the normalization is performed for all images by using the same normalization factor. Because, by using the same normalization factor, sharpness values of each image becomes comparable. Also, the normalization factor may be the maximum, minimum or average value of the all S(i)s of all images to be compared.

In S208, the sharpness factors S(i)s shows a sharpness value that each sub area has, and S(i) can be used to show a two dimensional sharpness map of the image. The two dimensional sharpness map is drawn by representing the density which corresponds to the value of each S(i) at the position of each sub area. So each of the sub areas is shown in the density which corresponds to the value of normalized S(i). The larger number of normalized S(i) is represented in a color closer to the white, and the smaller number of normalized S(i) is represented in a color closer to the black. In this embodiment, the two dimensional sharpness map is shown in gray scale but it is not limited to the grey but any color or any combination of color can be used. The two dimensional sharpness map shows where in the image has high sharpness and/or low sharpness.

In S209, the CPU 119 displays the result of the S208 with the image on the display 110 in the local PC 102 which allows the user to easily know which image has higher (or lower) sharpness by comparing the two dimensional sharpness map.

The two dimensional sharpness map is displayed as a grey scale image, where areas of high sharpness may be denoted in white, whereas areas of low sharpness may be denoted in black, whereas areas of varying level of sharpness in between may be displayed in a grey scale value corresponding to the sharpness of such area. The displayed grey scale denoting sharpness values may be standardized over multiple images allowing for comparison of sharpness between multiple images.

With multiple images with similar sharpness distributions, this sharpness map may be used to select and/or identify an image or images with the highest sharpness in specific regions. For example, ten separate images may exist that shows an image of a birthday cake with a flame lit candle where the focus point is on or near the flame of the candle. To search for the most in-focus image (the highest sharpness image out of the sample), the displayed area of the flame may be zoomed in, and each image may be checked individually and compared against the sample. Such process may be time consuming. The algorithm in FIG. 2 improves the ability to identify the sharpest image of the group of images by displaying a two dimensional sharpness map for each of the pixel regions in sample images may enable visual identification of the highest sharpness in and around the flame, by selecting the sharpness map with the whitest region of interest from the sample lot. This allows for instant recognition of the highest sharpness image for a given region of interest due to the empirical evaluation of the frequency information in the pixel regions of interest.

Figure 3:
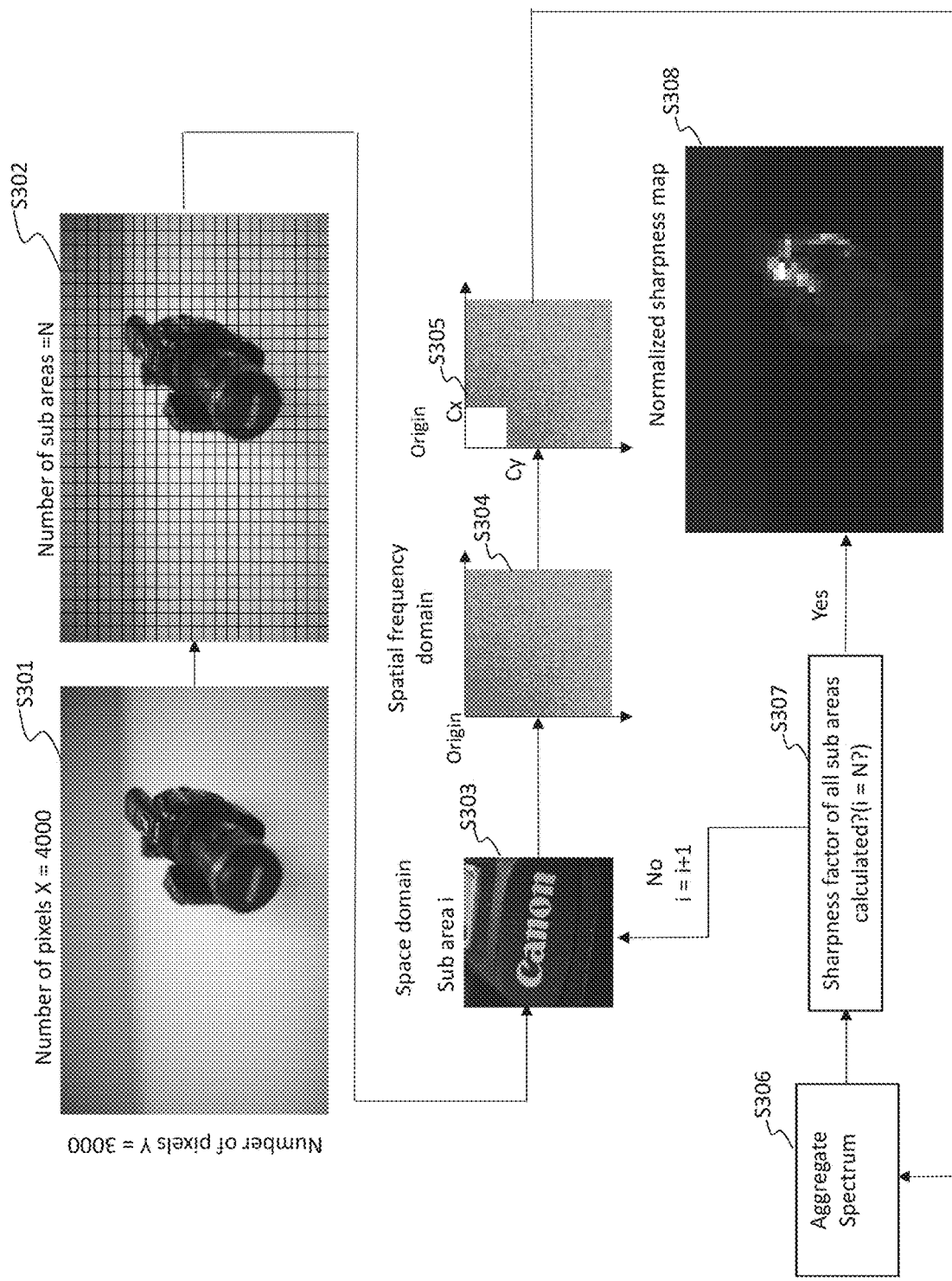
FIG. 3 is a flow diagram for sharpness evaluation based on sample images.

FIG. 3 illustrates a processing flow of the sharpness quantifying application according to the present exemplary embodiment with some sample images. The processing is realized by the CPU 119 reading a program recorded in the RAM 120 and/or in the ROM 121 and executing the program. The processing in FIG. 3 starts when the cloud storage server 103 is started up and the application for the sharpness quantifying processing is executed as described in FIG. 2.

In S301, the CPU 119 receives an image from the local PC 102. The image in S301 shows the image which is received as explained in S201. In this example, the image has 4000 pixels in X direction and 3000 pixels in Y direction.

In S302, the CPU 119 divides the image into N sub areas as explained in S203. In this case, the number of pixels of one sub area is n both in X direction and Y direction. Therefore, the number of sub areas in X direction becomes 4000/100=40, and the number of sub areas in Y direction becomes 3000/100=30. Since the figure only shows an example of the subdivision of an image, the number of sub areas illustrated in S302 is different from the actual numbers 40 and 30.

In S303, the CPU 119 selects a sub area i which is one of sub areas divided in S203. The image in S303 shows a sub area i divided in S203. The area can be selected in an arbitrary order from all sub areas.

In S304, the CPU 119 transforms the sub area i to spatial frequency domain. The image in S304 shows a spectrum diagram corresponding to the sub area i which is transformed by DCT method. Each element of the spectrum has a value of P(j). And the total number of elements is M. As shown in S304, the transformation performed illustrates the origin in the top left portion of the image whereby frequency values in both the x and y direction are lower and as one moves away from the origin in the x and y direction, the frequency is higher as compared to the frequencies at the origin.

In S305, the CPU 119 sets a high cut filter with cut off frequency (Cx, Cy)=(20,20) for the spectrum. The image in S305 shows a spectrum diagram with the high cut filter. As noted above in S304, the arrows in the x and y direction extending away from the origin point indicate regions in the x and y direction having higher frequencies.

In S306, as explained in S206, the CPU 119 aggregates the spectrum and determines a sharpness factor S(i). In this case, the S(i) is determined by summing up all elements in the spectrum diagram shown in S305 for j from 1 to M. The aggregation performed in S306 may be implemented using the following equation:

$$S(i) = \sum_{j=1}^{M} P(j)$$

In S307, as explained in S207, the CPU 119 determines if operation of S306 (S206) for all sharpness factor S(i)s are performed. If the CPU 119 determines that operation of S306 (S206) for all sharpness factor S(i)s are performed, the processing proceeds to S308 (S208) where the image is normalized.

In S308, the CPU 119 shows a normalized sharpness map. As explained in S208 and S209, the aggregated sharpness factor S(i)s are normalized and shown as shown in S308. The sharpness map in S304 shows which part of the image originally input a high sharpness value and low sharpness value. Comparing the image in S301 and the map generated in S308, it can be understood that the in focus area in the image corresponds to the area with high sharpness in the sharpness map and shown in white.

Figure 4:
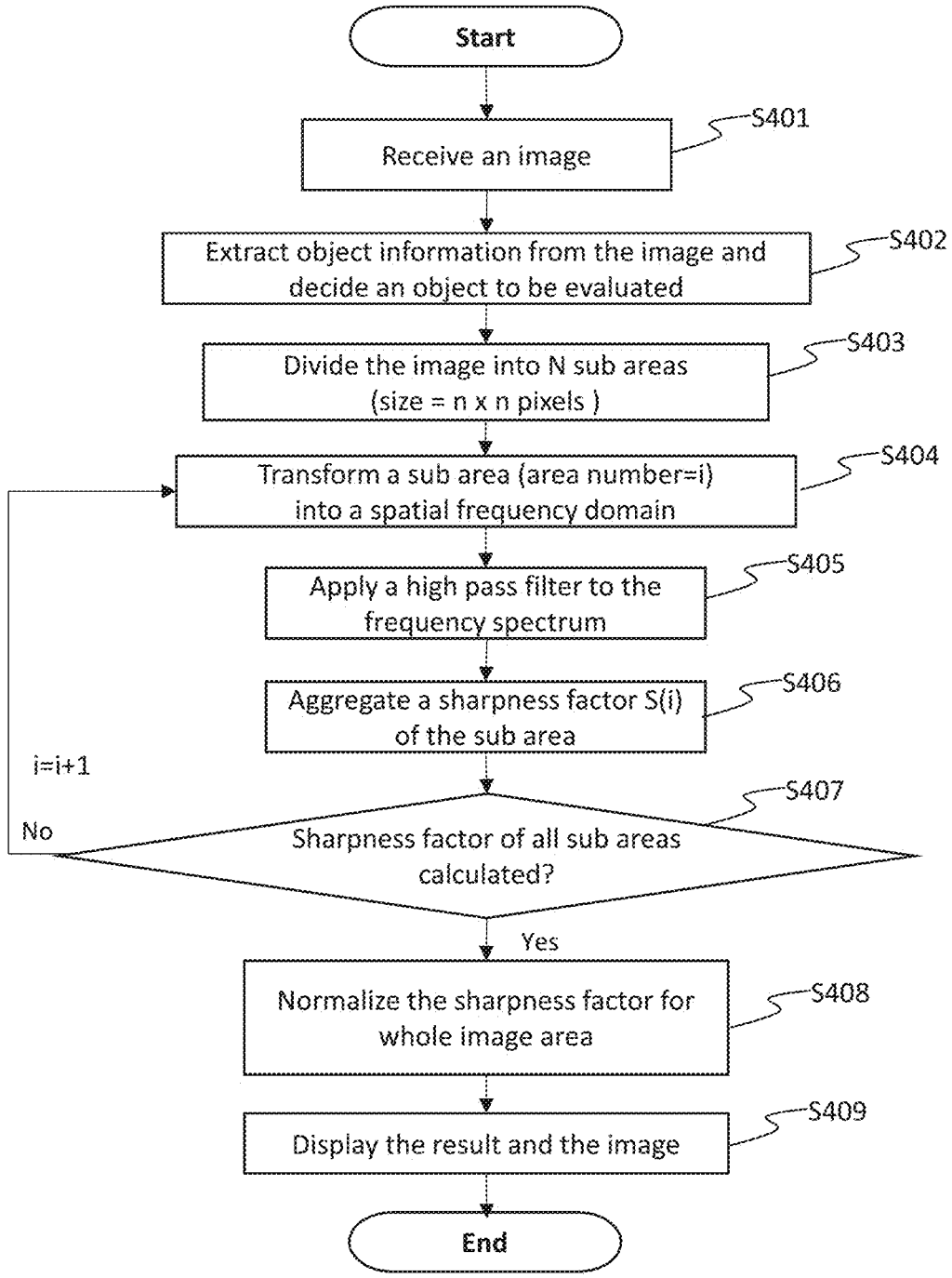
FIG. 4 is a flow diagram evaluation flow based on object detection.

FIG. 4 illustrates a flow chart of the sharpness quantifying processing according to the present exemplary embodiment.

The processing is realized by the CPU 119 developing a program recorded in the RAM 120 and/or in the ROM 121 and executing the program. The processing in FIG. 4 starts when the cloud storage server 103 is started up and the application for the sharpness quantifying processing becomes operable.

The difference between the processing in FIG. 4 and the processing in FIG. 2 is that the processing in FIG. 4 extracts object information from the image and decide an object to be evaluated. The quantifying processing can be performed only for a part of the image. And the part can be defined by the object detection results as explained in more with respect to FIG. 5 and FIG. 9.

Figure 5A:
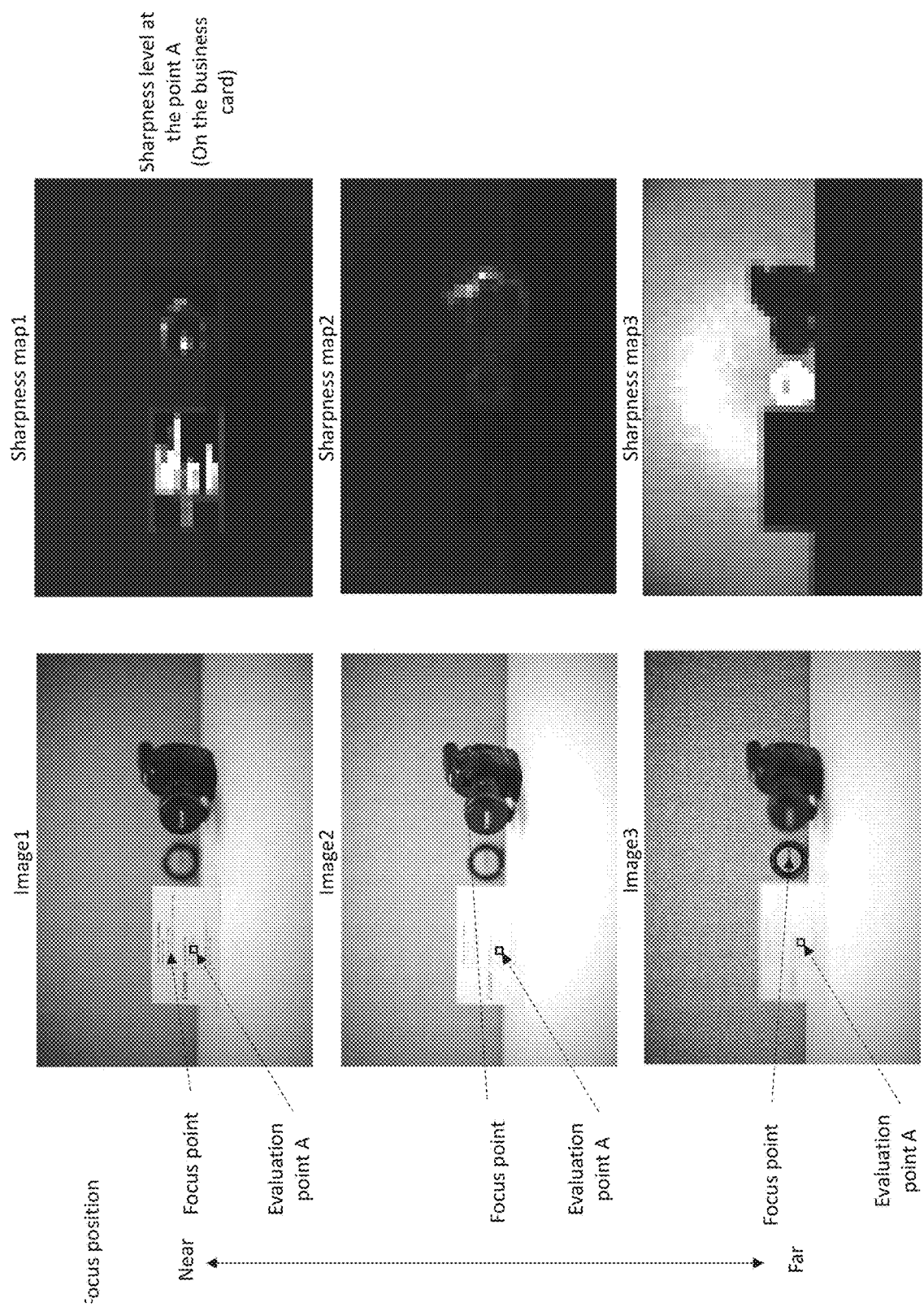
FIG. 5A is an example of sharpness level comparison among some images with different focus points.
Figure 5B:
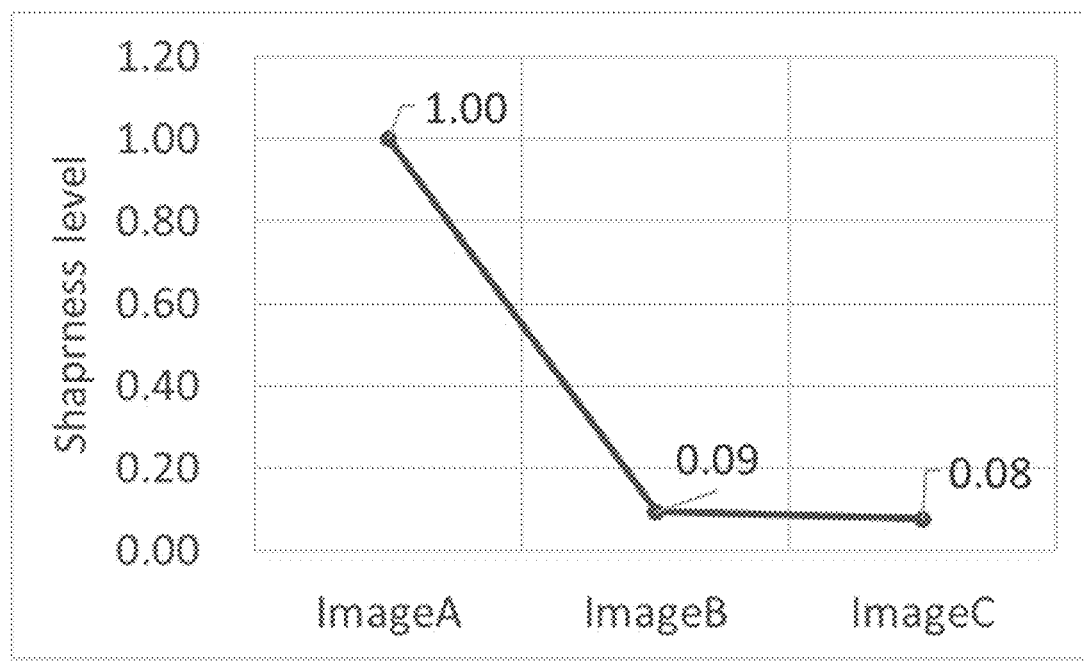
FIG. 5B is a graph illustrating the sharpness level comparison shown in FIG. 5A.

FIG. 5A illustrates examples of the sharpness quantifying processing applied to images having different focus points. As shown herein, the three images (Image 1, Image 2 and Image 3) have different focus point in each image. The focus point of Image 1 is on the business card placed in left side of the image. The focus point of Image 2 is on the camera body placed in right side of the image. The focus point of Image 3 is on the coin placed in the middle of the image. The focus point of Image 1 is closest to the camera used to capture the images and the focus point in Image 3 is the farthest whereas the focus point in Image 2 is at a distance between the focus points in Image 1 and Image 3. Sharpness of each image is evaluated by the method explained above and the resulting sharpness maps for each of Image 1, Image 2 and Image 3 are positioned adjacent to the original image. As noted above, sharpness and focal points can be ascertained based on the degree of white illustrated in the resulting sharpness map. It can be clearly understood that each image has different focus point and which part in each image has the highest sharpness in each image. In addition, the sharpness corresponds to position of the focus point in each image. This is empirically illustrated in the graph in FIG. 5B which shows a comparison of sharpness level at the evaluation point A in each image. The sharpness value of the image A has the highest value, and the value of the image B is smaller than that, and the value of the image C is further smaller. These values are correlated to human perception for the images A, B and C. Thus, the area in the evaluation point looks sharpest in the image A, and gradually becomes out of focus with the image B and C.

As shown in this examples, the sub area can be selected at arbitrary point in the image with the predetermined size. For example, if the user 101 wants to know a sharpness level at a point on the business card, the user can place the sub area to evaluate sharpness on the business card as shown in the image A, B and C as an evaluation point A. Otherwise, if the user 101 wants to know a sharpness level at a point on the coin, the user can place the sub area to evaluate sharpness on the coin. In addition, the position of the sub area can be determined by combining object detection results performed by an image recognition engine. If the user 101 defines an object, the sharpness of which is to be evaluated, the sub area can be placed on the object. For example, in a case that there is an image of a cat, and the user 101 wants to know a sharpness level on the eye of the cat, and the image recognition engine detects the eye of the cat in the image as a result of an object detection process. The sub area may be placed automatically by the CPU 119 on the eye of the cat by referring to object detection result. In this way, the sharpness level is evaluated by combining object detection results with the sharpness evaluation algorithm described herein. In this example, the sub area to evaluate sharpness level is defined using one sub area. This is merely exemplary and there are additional options to select the evaluation area which are described below with respect to FIG. 9.

Figure 6:
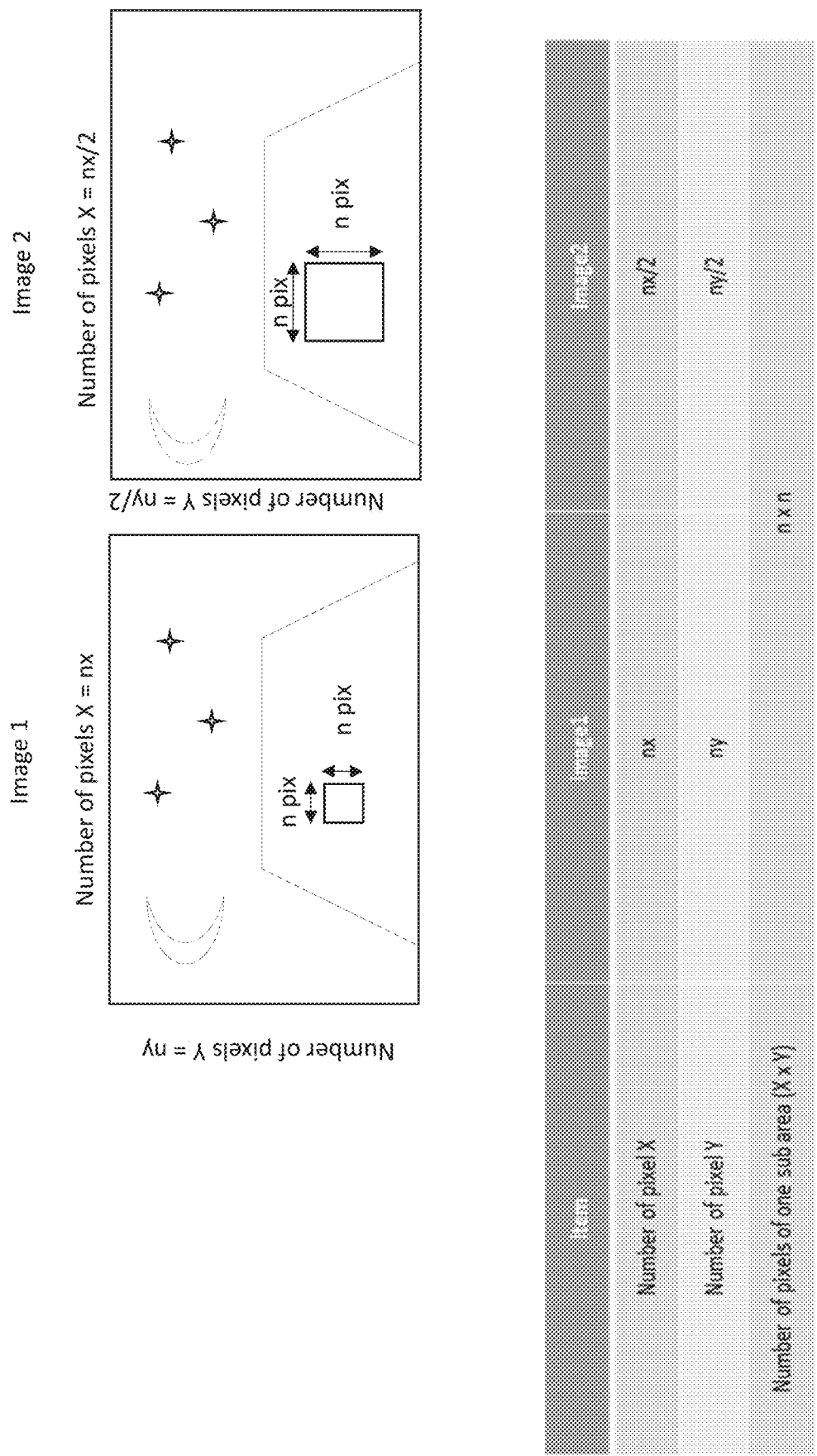
FIG. 6 is an exemplary algorithm for defining evaluation parameters for different image sizes.

FIG. 6 illustrates an example that applies the sharpness quantifying processing to images having different number of pixels. As explained in S203, the number of pixels of one sub area is predetermined and applied for images which have any image size. Image 1 in FIG. 6 has nx pixels in the X direction and ny pixels in the Y direction whereas Image 2 in FIG. 6 has nx/2 pixels in the X direction and ny/2 pixels in the Y direction where the predetermined number of pixels of one sub area is n. Under this condition, as shown in FIG. 6, one sub area is allocated on the images as shown in the figure. In this case, the sub area on Image 1 is smaller by area than the sub area on Image 2. In this way, the sharpness level can be calculated in the same fashion improves the ability to compare a sharpness level in images which have different image size (by pixels). Although in this example above Image 1 has double the number of pixels in each the x and y direction than that of Image 2, the difference in number of pixels of images may be arbitrary number. Further, this allocation method of a sub area may be used for any images with any number of pixels unless the image size is smaller than the predetermined sub area size.

Figure 7:
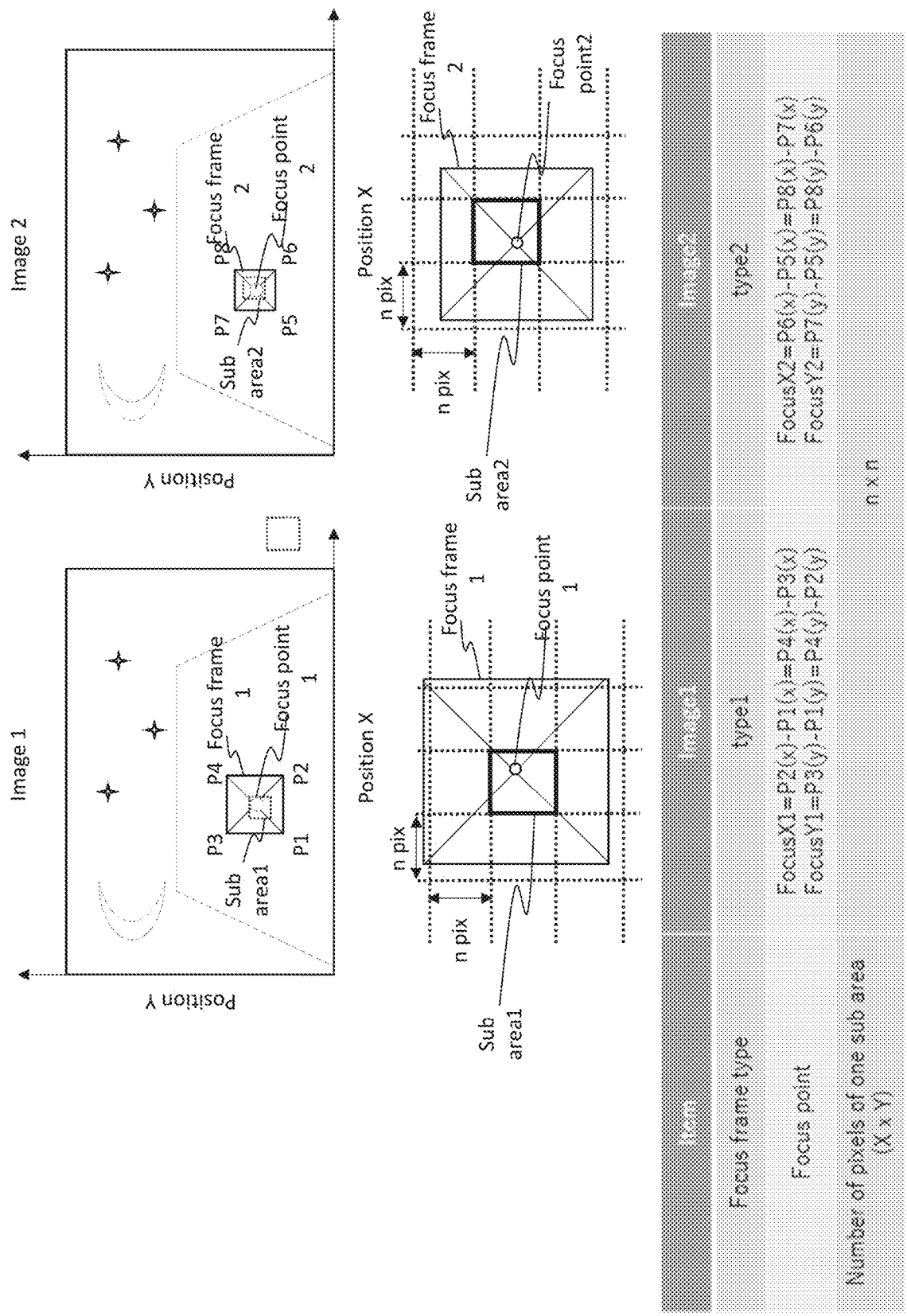
FIG. 7 is an exemplary algorithm for defining evaluation parameters for different focus frames.
Figure 8:
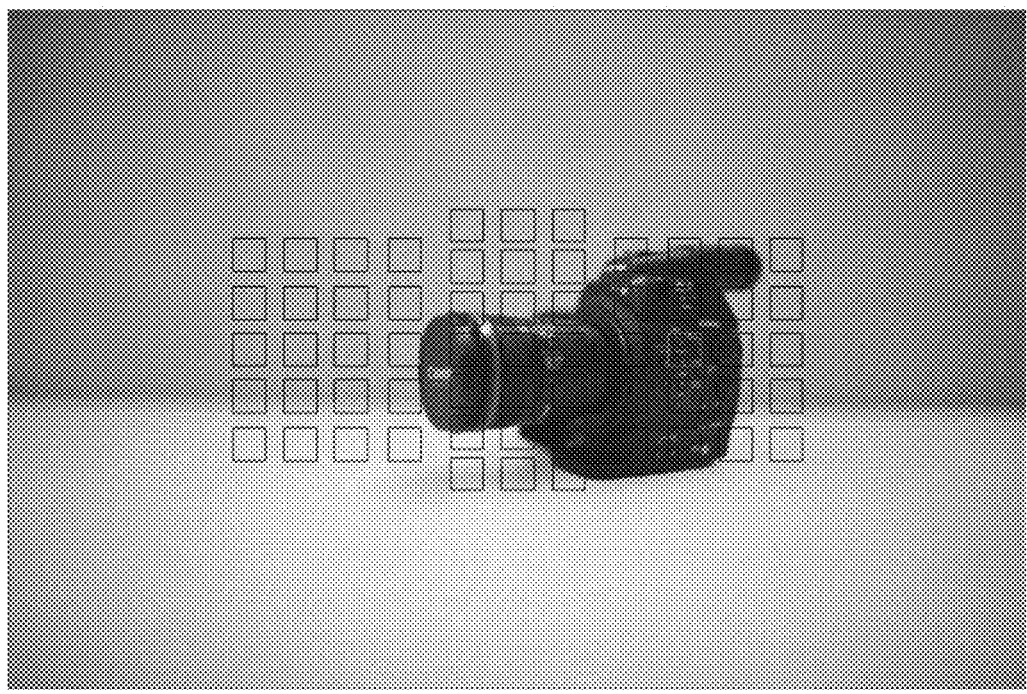
FIG. 8 is an examples of different focus frames.
Figure 8:
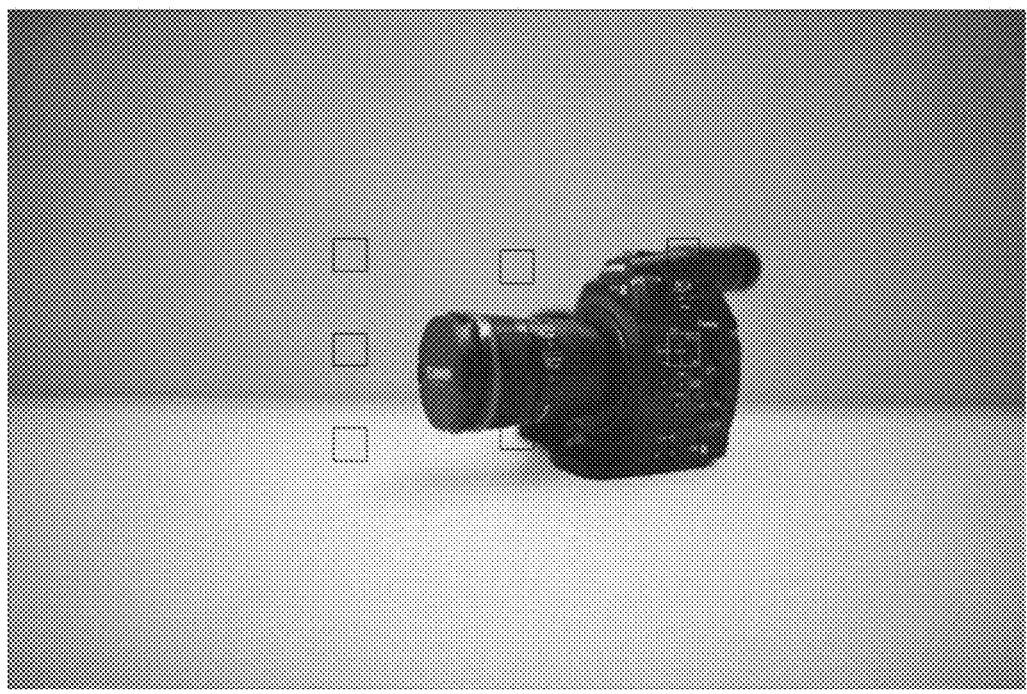

FIG. 7 illustrates an example to applying the sharpness quantifying processing to images having different focus area of the imaging devices (e.g. cameras) used to take those pictures. The two images are taken with the same field of view and different focus area setting. An example images which are taken with the same field of view and different focus area setting are shown in FIG. 8. In FIG. 8, Image 1 is taken with selectable AF point of 61 points and the focus point is placed on the camera body. On the other hand, the Image 2 is taken with selectable AF point of 9 points. Through the same way as Image 1, the focus point in Image 2 is placed on the camera figure body. In this way, the same object may be taken with the same field of view and the different focus area settings based on the focus area setting capability of the particular image device that captures the image.

Returning to FIG. 7, Image 1 shows an example to decide a position of sub area to be evaluated sharpness level. In this case, the position of the sub area 1 is determined as a sub area which has a center point of the focus frame 1 and focus point 1 is determined as the center point of the focus frame 1. Focus frame 1 has 4 points, P1, P2, P3 and P4, at each corner as shown in Image 1 of FIG. 7. The position of the center point may be defined as shown in the table as the focus point $(X1, Y1)=(P2(x)-P1(x), P3(y)-P1(y))$. In this case, $P2(x)-P1(x)=P4(x)-P3(x)$ and $P3(y)-P1(y)=P4(y)-P2(y)$, because focus frame 1 is square shape. Therefore, the sub area 1 to be evaluated sharpness level has the focus point 1 in the area. The selected focus frame can also be known by evaluating EXIF data of the image. Image 2 shows an example that decides a position of a sub area on which sharpness evaluation is to be performed. Similarly as discussed above with Image 1 in FIG. 7, the position of the sub area 2 is determined as a sub area which has a center point of focus frame 2, and the focus point is determined as the center point of focus frame 2. Therefore, the position of the focus point 2 is determined as $(X2, Y2)=(P6(x)-P5(x), P7(y)-P5(y))$. In this case, $P6(x)-P5(x)=P8(x)-P7(x)$ and $P7(y)-P5(y)=P8(y)-P6(y)$.

Figure 9:
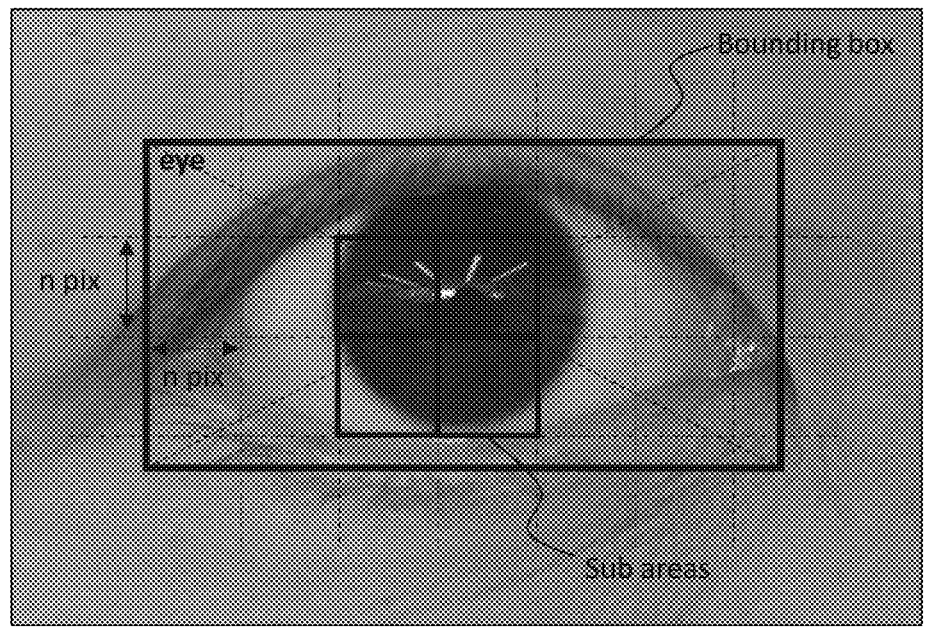
FIG. 9 is an example of defining a sub area depending on object detection result.
Figure 9:
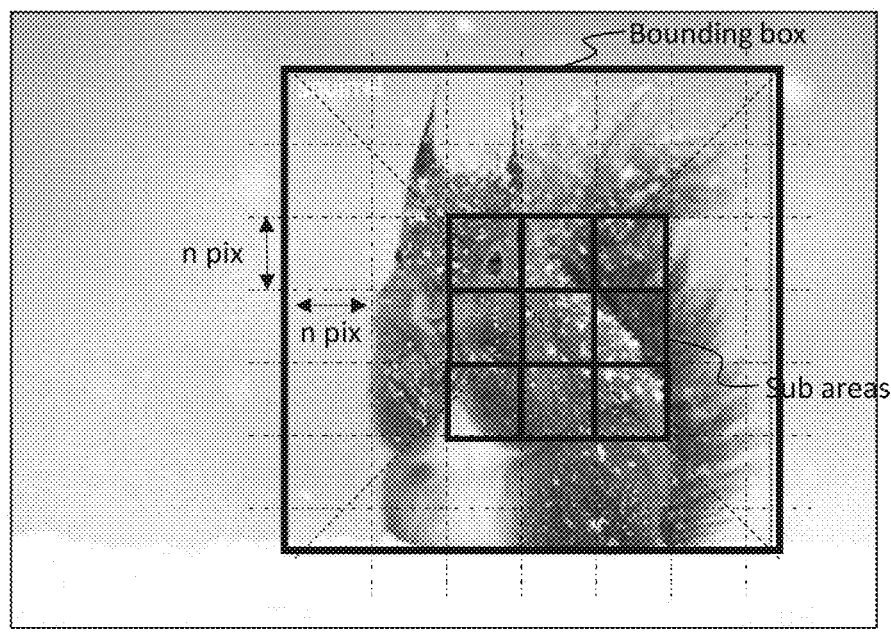

FIG. 9 shows examples of how an area on which sharpness evaluation is to be performed occurs by combining object detection results. Image 1 in FIG. 9 shows an example for defining an area to evaluate sharpness for eye. In this case, an image recognition engine which processes Image 1 and performs object detection thereon, detects an eye in the image. A bounding box is placed on the image. In the bounding box, sub areas are determined and placed as explained in FIG. 3 for the whole image. However, the present operation illustrated in FIG. 9 differs from the division in FIG. 3 in that the sub areas determined and position in FIG. 9 are placed only in the bounding box. However, as indicated in FIG. 3 above, the size of one sub area is determined beforehand.

Criteria can be determined that causes the CPU 119 to determine an area on which sharpness evaluation is to be performed. In this example, the criteria is applied such that the object detection engine identifies regions of an image where "Iris and pupil ratio>50%, Average". The iris and pupil ratio means that how much area the iris and pupil of the eye occupies of each sub area. In Image 1 of FIG. 9, four sub areas marked in white line are determined to satisfy the criteria and include a ratio of pupil and iris that is larger than 50%. CPU 119 selects the four sub areas as an area to evaluate sharpness level. Then, the CPU 119 calculates sharpness factor S(i)s for the four sub areas in the same manner as discussed above in FIG. 2 and FIG. 3. The average value for the four sub areas is calculated based on the criteria "Average" and the CPU 119 determines the sharpness level of the area which equals to the average of the 4 sub areas above.

Image 2 shows an example that defines an area to evaluate sharpness for a general object within the image. In this case, the image recognition engine detects a squirrel in the image and the bounding box is placed on the image in grey. In the bounding box, sub areas are placed as explained in the example for the Image 1.

In this example, the criteria used to decide the area on which sharpness evaluation is to be performed is "3×3 from the center, Average". The criteria means that an area to evaluate sharpness level is decided as the sub area which has the center of the bounding box and the surrounding eight sub areas as shown in Image 2 in white lines. The center of the bounding box may be defined as an intersection of diagonal lines. Therefore, the number of sub areas of the area to evaluate sharpness level is nine (3×3). The CPU computes sharpness factor S(i)s for the nine sub areas through the same way explained for Image 1 and calculates the average value for the nine sub areas based on the criteria "Average". From there, the CPU 119 determines the sharpness level of the area which equals to the average of the nine sub areas above.

FIG. 9 illustrates how to determine an area to evaluate sharpness level for sub areas of an image based on criteria (which may be user set or pre-defined based on object detection processing). This is merely exemplary and the method may be changed based on situations. For example, the area to evaluate sharpness level may be defined to be a square where its size is minimal in size to cover the iris and pupil of a human eye for the Image 1 or the area may be defined as an oval to include the entire whites of the human eye. As another example, if a racing car is detected in the image, the boundary region could be defined as to draw a minimum size rectangle around the driver cockpit, or a square around the driver. The area may be defined based on various situations or circumstances.

This disclosure provides a mechanism for quantifying a sharpness value more effectively and precisely by aggregating power spectrum in spatial frequency domain. As a result, the it can provide an effective way to find desired image which has a specified sharpness value on a specific area or an object.

The control performed by the above-described system control unit 111 may be performed by one piece of hardware, or the entire apparatus may be controlled by a plurality of pieces of hardware dividing the processing among the pieces of hardware.

Further, according to the above-described exemplary embodiment, although a case is described in which the present disclosure is applied to a PC, the present disclosure is not limited to this example. For example, the present disclosure can be applied to any apparatus, as long as the apparatus is capable of displaying all or a part of a plurality of selectable items on a screen, and selecting an item from among the plurality of items by a touch operation. More specifically, the present disclosure can be applied to apparatuses such as a personal digital assistant (PDA), a mobile phone terminal, a portable image viewer, a printer apparatus including a display, a digital photo frame, a music player, a game console, an electronic book reader, a tablet terminal, and the like.

Aspects of the present disclosure can also be realized by a computer of a system or apparatus (or devices such as a CPU, a micro processing unit (MPU), or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium).

While the present disclosure has been described with reference to exemplary embodiments, it is to be understood that the disclosure is not limited to the disclosed exemplary embodiments.

I claim:

1. An image processing method comprising:
acquiring an image from an image capturing apparatus;
obtaining an object information characterizing a position of an object within the captured image,
dividing, based on the object information, an area surrounding the position of the object into a plurality of regions each being a predetermined size;
evaluating sharpness in each of the plurality of regions;
generating, based on the evaluated sharpness in each of a plurality of regions within the captured image according to the object information, sharpness information representing a numeric value regarding a sharpness of the captured image; and
controlling the display the sharpness information with the captured image on a display.

2. The method according to claim 1, wherein the numeric value corresponds to an average of a sharpness evaluation value of each of the plurality of divided regions identified according to the object information.

3. The method according to claim 1, wherein the numeric value is corresponding to a maximum value of a sharpness evaluation value of each of the plurality of divided regions identified according to the object information.

4. The method according to claim 1, wherein the numeric value is corresponding to a minimum value of a sharpness evaluation value of each of the plurality of divided regions identified according to the object information.

5. The method according to claim 1, wherein the plurality of divided regions are located around an eye of a subject in the captured image.

6. The method according to claim 1, wherein a type of the object is designated by a user.

7. The method according to claim 1, wherein the sharpness is evaluated based on a high frequency component of image data of each divided region.

8. The method according to claim 7, wherein an intensity of the high frequency component is specified using a filtered data obtained by applying a high-pass filter to the image data of each divided region.

9. The method according to claim 1, wherein a sharpness map representing sharpness evaluation result of each of the plurality of divided regions is displayed as the sharpness information.

10. An image processing apparatus comprising:
at least one memory storing instructions; and
at least one processor, that upon execution of the instructions, is configured to
acquire an image from an image capturing apparatus;
obtain an object information characterizing a position of an object within the captured image,
divide, based on the object information, an area surrounding the position of the object into a plurality of regions each being a predetermined size;
evaluating sharpness in each of the plurality of regions;
generate, based on the evaluated sharpness in each of a plurality of regions within the captured image according to the object information, sharpness information representing a numeric value regarding a sharpness of the captured image; and
control display the sharpness information with the captured image on a display.

11. The apparatus according to claim 10, wherein the numeric value corresponds to an average of a sharpness evaluation value of each of the plurality of divided regions identified according to the object information.

12. The apparatus according to claim 10, wherein the numeric value is corresponding to a maximum value of a sharpness evaluation value of each of the plurality of divided regions identified according to the object information.

13. A non-transitory computer readable storage medium storing instructions that, when executed by at least one processor, configure the processor to perform an image processing method, the method comprising:
acquiring an image from an image capturing apparatus;
obtaining an object information characterizing a position of an object within the captured image,
dividing, based on the object information, an area surrounding the position of the object into a plurality of regions each being a predetermined size;
evaluating sharpness in each of the plurality of regions;
controlling generating, based on the evaluated sharpness in each of a plurality of regions within the captured image according to the object information, sharpness information representing a numeric value regarding a sharpness of the captured image; and
controlling the display the sharpness information with the captured image on a display.

14. The non-transitory computer readable storage medium according to claim 13, wherein the numeric value corresponds to an average of a sharpness evaluation value of each of the plurality of divided regions identified according to the object information.

15. The non-transitory computer readable storage medium according to claim 1, wherein the numeric value is corresponding to a maximum value of a sharpness evaluation value of each of the plurality of divided regions identified according to the object information.

* * * * *